(12) United States Patent
Ishikawa et al.

(10) Patent No.: US 12,739,896 B2
(45) Date of Patent: Sep. 15, 2026

(54) NETWORK NODE, AND COMMUNICATION METHOD

(71) Applicant: NTT DOCOMO, INC., Tokyo (JP)

(72) Inventors: Hiroshi Ishikawa, Tokyo (JP); Atsushi Minokuchi, Tokyo (JP); Yuji Suzuki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 308 days.

(21) Appl. No.: 18/294,827

(22) PCT Filed: Aug. 6, 2021

(86) PCT No.: PCT/JP2021/029444
§ 371 (c)(1),
(2) Date: Feb. 2, 2024

(87) PCT Pub. No.: WO2023/013078
PCT Pub. Date: Feb. 9, 2023

(65) Prior Publication Data
US 2024/0340978 A1 Oct. 10, 2024

(51) Int. Cl.
*H04W 76/10* (2018.01)
*H04W 28/16* (2009.01)

(52) U.S. Cl.
CPC ........... *H04W 76/10* (2018.02); *H04W 28/16* (2013.01)

(58) Field of Classification Search
CPC ............... H04L 63/0281; H04L 63/029; H04L 65/1016; H04L 65/1036; H04L 65/1045; H04L 65/1063; H04L 65/1069; H04L 67/02; H04L 67/51; H04L 67/565; H04W 28/16; H04W 76/00; H04W 76/10
See application file for complete search history.

(56) References Cited

U.S. PATENT DOCUMENTS 6,400,695 B1 * 6/2002 Chuah .............. H04W 74/0875 455/515

FOREIGN PATENT DOCUMENTS

JP 2000-201383 A 7/2000
WO 2014/017629 A1 1/2014

OTHER PUBLICATIONS

Notice of the Reasons for Rejection in Japanese Application No. 2023-539589, dated Jan. 7, 2025 (6 pages).
3GPP TS 23.501 V17.1.1; “3rd Generation Partnership Project; Technical Specification Group Services and System Aspects; System architecture for the 5G System (5GS); Stage 2 (Release 17)”; Jun. 2021 (526 pages).

(Continued)

*Primary Examiner* — Nader Bolourchi
(74) *Attorney, Agent, or Firm* — Osha Bergman Watanabe & Burton LLP

(57) ABSTRACT

A network node that transfers a signal between a service-user-side network node and a service-provider-side network node includes: a reception section that receives a first control signal including information indicating an application of connection requested by the service-user-side network node; a control section that determines whether the connection for the application is permitted; and a transmission section that transmits a second control signal including information indicating a result of the determination to the service-user-side network node.

5 Claims, 8 Drawing Sheets

(56) References Cited

OTHER PUBLICATIONS

3GPP TS 29.573 V17.1.0; "3rd Generation Partnership Project; Technical Specification Group Core Network and Terminals; 5G System; Public Land Mobile Network (PLMN) Interconnection; Stage 3 (Release 17)"; Jun. 2021 (102 pages).
International Search Report issued in corresponding International Application No. PCT/JP2021/029444, mailed on Mar. 15, 2022 (5 pages).
Written Opinion issued in corresponding International Application No. PCT/JP2021/029444, mailed on Mar. 15, 2022 (3 pages).

* cited by examiner

| Attribute name | Data type | P | Cardinality | Description |
| --- | --- | --- | --- | --- |
| sender | Fqdn | M | 1 | This IE shall uniquely identify the SEPP that is sending the request. This IE is used to store the negotiated security capability against the right SEPP. |
| supportedSecCapabilityList | array(SecurityCapability) | M | 1..N | This IE shall contain the list of security capabilities that the requesting SEPP supports. |
| 3GppSbiTargetApiRootSupported | boolean | C | 0..1 | This IE should be present and indicate that the 3gpp-Sbi-Target-apiRoot HTTP header is supported, if TLS security is supported for N32f message forwarding.<br><br>When present, it shall indicate if TLS security using the 3gpp-Sbi-Target-apiRoot HTTP header is supported:<br>- true: supported<br>- false (default): not supported |
| plmnIdList | array(PlmnId) | O | 1..N | A list of PLMN IDs associated with the SEPP, which is sending the request. The list to be stored by the receiving SEPP in a N32-f Context (see clause 5.9.3 in 3GPP TS 33.501 [6]) |
| usagePurpose | Array(n32Purpose) | O | 1..N | This IE notifies the list of requested usage purposes the n32 is established for. The list contains values defined in n32Purpose which contains one or more of the following:<br>- Roaming<br>- Interconnect<br>- General<br>- Roaming_test<br>- Interconnect_test<br>- General_test<br>- other |

FIG. 4

| Attribute name | Data type | P | Cardinality | Description |
|---|---|---|---|---|
| sender | Fqdn | M | 1 | This IE shall uniquely identify the SEPP that is sending the response. This IE is used to store the negotiated security capability against the right SEPP. |
| selectedSecCapability | SecurityCapability | M | 1 | This IE shall contain the security capability selected by the responding SEPP. |
| 3GppSbiTargetApiRootSupported | boolean | C | 0..1 | This IE should be present and indicate that the 3gpp-Sbi-Target-apiRoot HTTP header is supported, if TLS security is negotiated for N32f message forwarding and the initiating SEPP indicated support of this header.<br><br>When present, it shall indicate if TLS security using the 3gpp-Sbi-Target-apiRoot HTTP header is supported:<br>- true: supported<br>- false (default): not supported |
| plmnIdList | array(PlmnId) | O | 1..N | A list of PLMN IDs associated with the SEPP, which is sending the response. The list to be stored by the receiving SEPP in a N32-f Context (see clause 5.9.3 in 3GPP TS 33.501 [6]) |
| usagePurpose | Array(n32Purpose) | O | 1..N | This IE notifies the list of requested usage purposes the n32 is established for. The list contains values defined in n32Purpose which contains one or more of the following:<br>- Roaming<br>- Interconnect<br>- General<br>- Roaming_test<br>- Interconnect_test<br>- General_test<br>- other |

FIG. 5

Table: Enumeration n32Purpose

| Enumeration value | Description |
|---|---|
| "Roaming" | Signaling dedicated to roaming usage |
| "Interconnect" | Signaling dedicated to interconnect usage |
| "General" | Signaling corresponding to general usage |
| "Roaming_test" | Signaling dedicated to roaming usage, allowed only for test subscribers/SUPI |
| "Interconnect_test" | Signaling dedicated to interconnect usage, allowed only for test subscribers/SUPI |
| "General_test" | Signaling dedicated to general usage, allowed only for test subscribers/SUPI |
| "other" | Usage that does not belong to any of the above |
| | |

FIG. 6

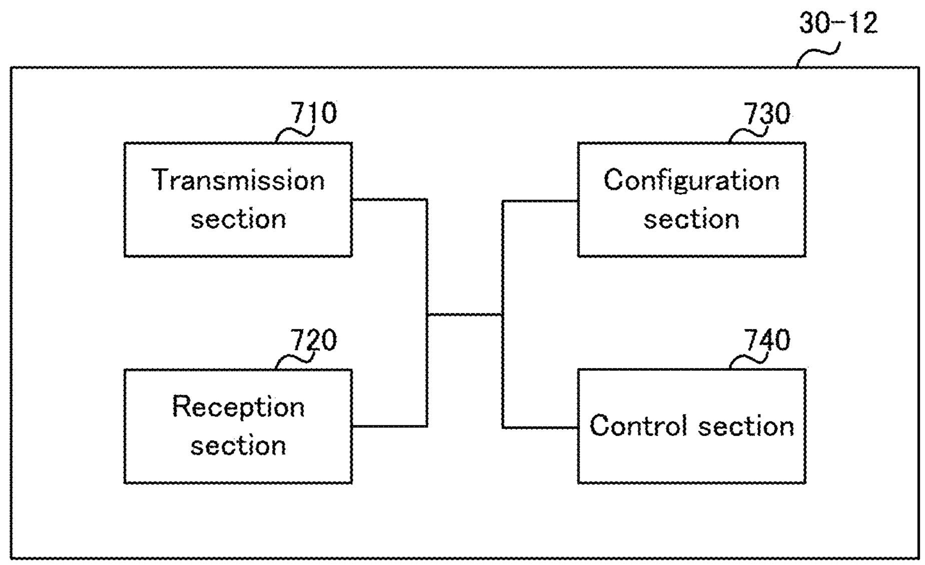
FIG. 8
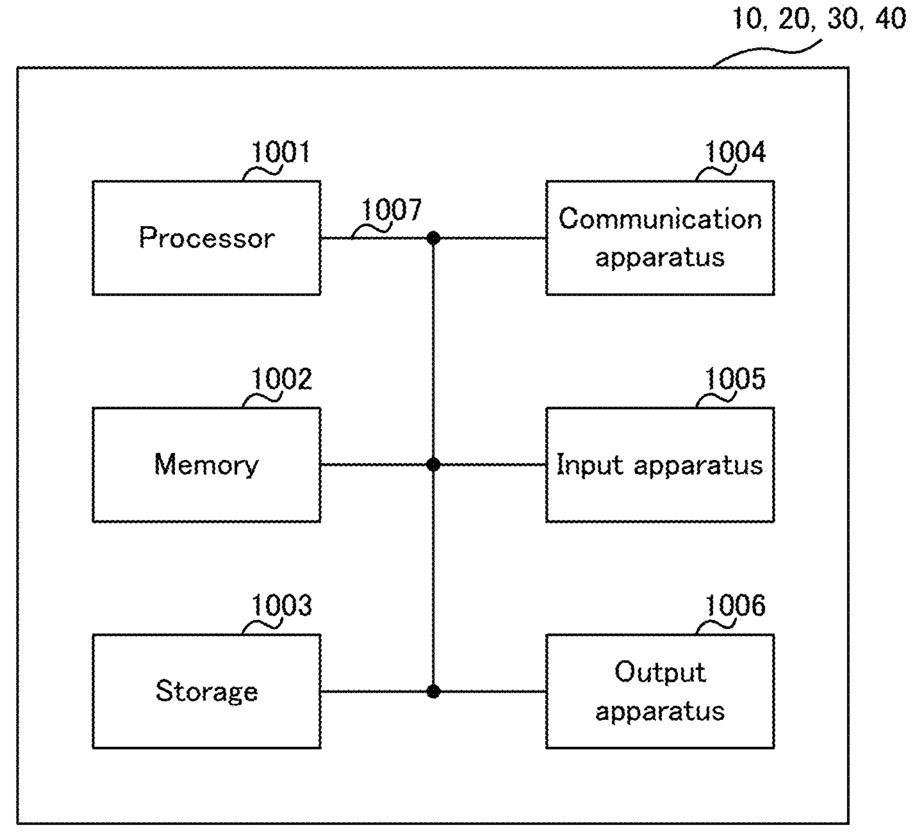
FIG. 9

NETWORK NODE, AND COMMUNICATION METHOD

TECHNICAL FIELD

The present disclosure relates to a network node and a communication method.

BACKGROUND ART

In the 3rd Generation Partnership Project (3GPP), in order to realize a further increase in system capacity, a further increase in data transmission rate, a further decrease in delay in a radio section, and/or the like, a radio communication system called 5G or New Radio (NR) (hereinafter, the radio communication system is referred to as "5G" or "NR") has been discussed. In 5G, various radio technologies have been discussed in order to satisfy the requirement that the delay of the radio section be 1 ms or less while achieving the throughputs equal to or greater than 10 Gbps.

In NR, the network architecture has been studied, which includes a 5G Core Network (5GC) corresponding to Evolved Packet Core (EPC), which is the core network in the Long Term Evolution (LTE) network architecture, and Next Generation—Radio Access Network (NG-RAN) corresponding to Evolved Universal Terrestrial Radio Access Network (E-UTRAN), which is Radio Access Network (RAN) in the LTE network architecture.

In the 5GC network architecture, N32 is defined as a reference point at a connection point between a home network (Home Public Land Mobile Network (HPLMN) of user equipment (UE) and an existing area network (Visited Public Land Mobile Network (VPLMN)) of a UE (see Non-Patent Literature (hereinafter, referred to as "NPL") 1).

The N32 interface can be logically considered as the following two different interfaces (see NPL 2).

N32-c: Interface for control plane between Security Edge Protection Proxies (SEPPs) for the initial connection establishment (Handshake) and negotiation of parameters to be applied to the actual N32 message transfer.

N32-f: Transfer interface between SEPPs used to transfer a signal between a service consumer and a service producer after application of an application-level security protection.

CITATION LIST

Non-Patent Literatures

NPL 1
3GPP TS 23.501 V17.1.1 (2021-06)
NPL 2
3GPP TS 29.573 V17.1.0 (2021-06)

SUMMARY OF INVENTION

Technical Problem

In Release 17, Service Based Architecture (SBA) has been standardized to realize deployment of a wide variety of services while promptly and mutually adding functions between an originator of Short Message Service Centre (SMSC) and a receiver of SMSC in the core network of 5G as well. As a result, Interconnect (interconnection) may exist other than Roaming as an application (purpose) of connection between carriers.

In the current specification, the application of usage of N32 is limited to Roaming, so that an SEPP can determine whether connection of N32 is possible only in accordance with the presence or absence of Roaming Relationship.

Meanwhile, theoretically, N32 can be used for an application other than Roaming, such as Interconnect.

There is, however, no parameter that allows checking of an application at present, so that use of N32 for an application other than Roaming makes it difficult for SEPPs to determine whether connection of N32 is possible.

One aspect of the present disclosure provides a network node and a communication method each making it possible to appropriately determine whether connection of N32 is possible even when N32 is used for a plurality of applications.

Solution to Problem

A network node according to one aspect of the present disclosure is a network node that transfers a signal between a service-user-side network node and a service-provider-side network node, the network node including: a reception section that receives a first control signal including information indicating an application of connection requested by the service-user-side network node; a control section that determines whether the connection for the application is permitted; and a transmission section that transmits a second control signal including information indicating a result of the determination to the service-user-side network node.

A communication method according to one aspect of the present disclosure is a communication method for a network node that transfers a signal between a service-user-side network node and a service-provider-side network node, the communication method including: receiving a first control signal including information indicating an application of connection requested by the service-user-side network node; determining whether the connection for the application is permitted; and transmitting a second control signal including information indicating a result of the determination to the service-user-side network node.

BRIEF DESCRIPTION OF DRAWINGS

FIG. 4 is a diagram illustrating definition of SecNegotiationReqData according to the embodiment of the present disclosure;

FIG. 5 is a diagram illustrating definition of SecNegotiationRspData according to the embodiment of the present disclosure;

FIG. 6 is a diagram illustrating an example in which applications of N32 according to the embodiment of the present disclosure are defined in ENUM type;

FIG. 8 is a diagram illustrating an exemplary functional configuration of an SEPP according to the embodiment of the present disclosure; and FIG. 9 is a diagram illustrating an exemplary hardware configuration of a terminal, a base station, a data hub access support apparatus, or another network node, according to the embodiment of the present disclosure.

DESCRIPTION OF EMBODIMENTS

Hereinafter, a description will be given of an embodiment of the present disclosure with reference to the drawings. The embodiment to be described below is exemplary and an embodiment to which the present disclosure is applied are not limited to the following embodiment.

As to operations of a radio communication system of an embodiment of the present disclosure, the existing techniques may be used as appropriate, and these existing techniques include the current LTE or 5G, but are not limited to the current LTE or 5G.

In the following descriptions, nodes, signals and/or the like are referred to as in the current 5G specification (or LTE specification), but node, signals, and/or the like having the same functions as those may be referred to by terms other than those used in these specifications.

In an embodiment of the present disclosure described below, the following terms used in the current LTE may be used; for example, Synchronization Signal (SS), Primary SS (PSS), Secondary SS (SSS), Physical Broadcast Channel (PBCH), Physical Random Access Channel (PRACH), Physical Downlink Control Channel (PDCCH), Physical Downlink Shared Channel (PDSCH), Physical Uplink Control Channel (PUCCH), and Physical Uplink Shared Channel (PUSCH). In addition, the above-mentioned terms in NR correspond to NR-SS, NR-PSS, NR-SSS, NR-PBCH, NR-PRACH, NR-PDCCH, NR-PDSCH, NR-PUCCH, NR-PUSCH and/or the like. However, a signal used for NR is not necessarily termed with "NR—."

(System Configuration Example)

Figure 1:
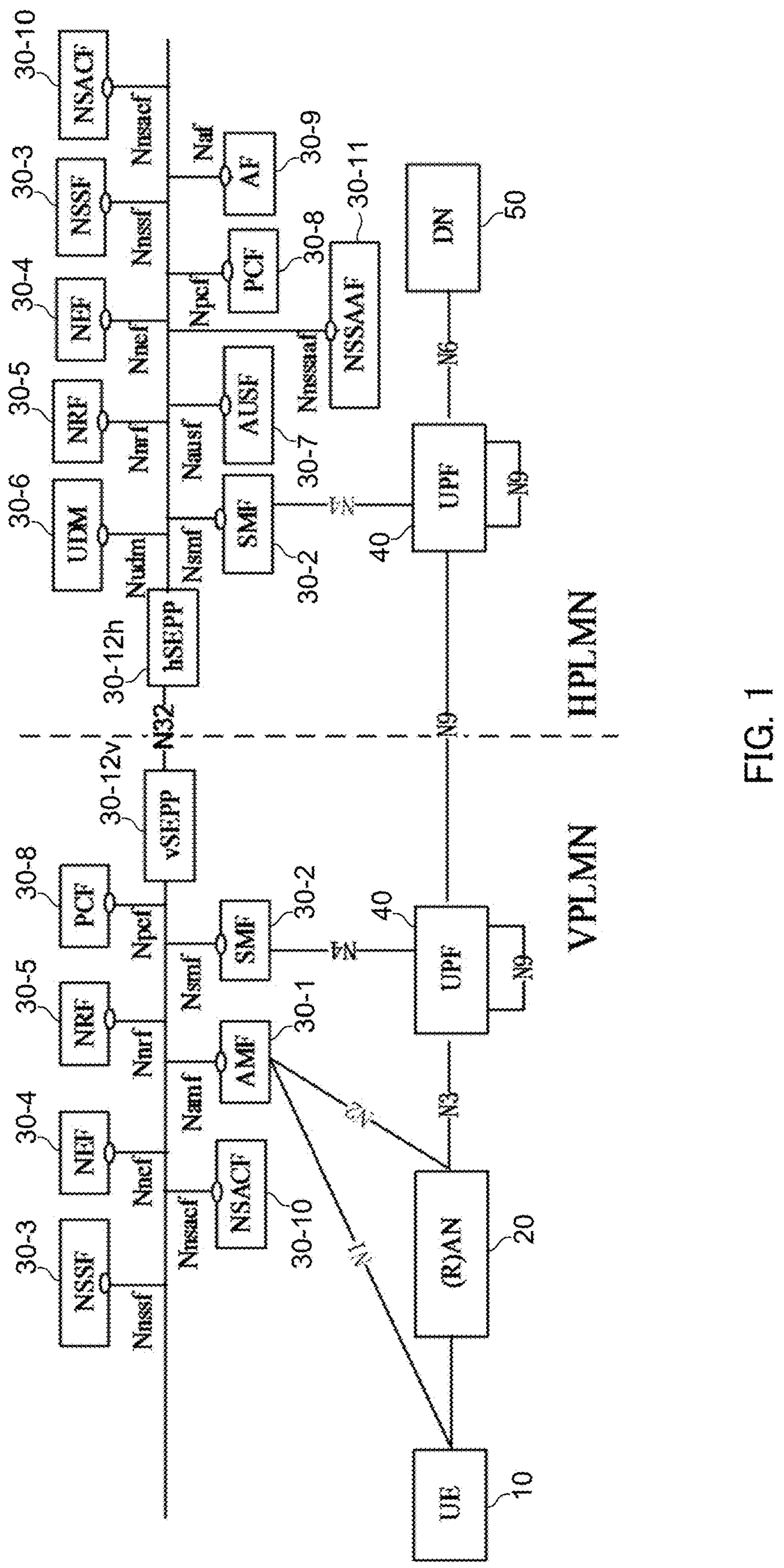
FIG. 1 is a diagram illustrating an exemplary communication system according to an embodiment of the present disclosure.

Next, communication system 1 according to an embodiment of the present disclosure will be described with reference to FIG. 1. FIG. 1 illustrates a configuration of a communication system in the form of Roaming.

Communication system 1 includes, for example, UE 10 (User Equipment: may be referred to as a (user) terminal, and a plurality of network nodes 20, 30-1 to 30-12 (may be referred to as Network Function (NF)), and 40. Hereafter, an assumption is made that one network node corresponds to each function, but one network node may realize a plurality of functions, or a plurality of network nodes may realize one function. Further, the term "connection" described below may be a logical connection or a physical connection.

Communication system 1 is a system included in a 5G network system, and is a system that provides a network service to UE 10 by data communication. The term "network service" refers to a service using network resources, such as a communication service (e.g., leased line service) and/or an application service (e.g., video streaming, and/or a service using a sensor device, such as an embedded device).

In FIG. 1, it is assumed that UE 10 is in a roaming environment. The expression "UE 10 is in a roaming environment" means a state in which the user of UE 10 performs communication by accessing VPLMN, which is a network other than HPLMN. The term VPLMN refers to a network where UE 10 is currently present (currently present network), and the term HPLMN refers to a network provided by a subscribed carrier of the user of UE 10. In this embodiment, VPLMN is the first network and HPLMN is the second network.

VPLMN of communication system 1 is formed of UE 10, (Radio) Access Network ((R)AN) 20, Access and Mobility Management Function (AMF) 30-1, Session Management function (SMF) 30-2, Network Slice Selection Function (NSSF) 30-3, Network Exposure Function (NEF) 30-4, Network Repository Function (NRF) 30-5, Policy Control Function (PCF) 30-8, Network Slice Admission Control Function (NSACF) 30-10, Security Edge Protection Proxy (SEPP) 30-12, and User Plane Function (UPF) 40.

HPLMN of communication system 1 is formed of SMF 30-2, NSSF 30-3, NEF 30-4, NRF 30-5, Unified Data Management (UDM) 30-6, Authentication Server Function (AUSF) 30-7, PCF 30-8, Application Function (AF) 30-9, NSACF 30-10, Network Slice Specific Authentication and Authorization Function (NSSAAF) 30-11, SEPP 30-12, and UPF 40.

(R)AN 20 is a network node having a radio access function, and may be, for example, a next generation NodeB (gNB) (may be referred to as a base station) 20.

AMF 30-1 is a network node with functions, such as termination of a RAN interface, termination of Non-Access Stratum (NAS), registration management, connection management, reachability management, and mobility management, for example.

SMF 30-2 is a network node with functions, such as session management, Internet Protocol (IP) address allocation and management of UEs, a Dynamic Host Configuration Protocol (DHCP) function, an Address Resolution Protocol (ARP) proxy, and a roaming function.

NSSF 30-3 is a network node with functions, such as selecting a network slice to which a UE is connected, determining Network Slice Selection Assistance Information (NSSAI) to be permitted, determining an NSSAI to be configured, and determining an AMF set to which a UE is connected.

NEF 30-4 is a network node with a function to indicate an ability and an event to another NE.

NRF 30-5 is a network node with a function to discover an NF instance for providing a service.

UDM 30-6 is a network node that manages subscriber data and authentication data. UDM 30-6 is connected to a User Data Repository (UDR) that holds the data.

AUSF 30-7 is a network node that authenticates a subscriber/UE 10 for the subscriber data held in the UDR.

PCF 30-8 is a network node with a function to perform network policy control.

AF 30-9 is a network node with a function to control an application server.

NSACF 30-10 is a network node with a function to control authorization of a network slice.

NSSAAF 30-11 is a network node with a function to control authentication/authorization of a network slice.

SEPP 30-12 is a network node having a proxy to control filtering and policy restriction of a message during interaction of control plane between carriers. Note that, SEPP 30-12 on a VPLMN side is referred to as vSEPP **30-12*v*, and SEPP 30-12 on an HPLMN side is referred to as hSEPP 30-12*h*. Herein, vSEPP 30-12*v* and hSEPP 30-12*h*** provide functions on security and integrity for messages (such as HTTP Request, HTTP Response) transmitted and received between VPLMN and HPLMN.

UPF 40 is a network node with a function, such as being an external Protocol Data Unit (PDU) session point, routing and forwarding of packets, and handling of user plane Quality of Service (QoS).

Incidentally, N1, N2, N3, N4, and N9 are each a reference point between network nodes. Further, N32 between vSEPP 30-12*v* and hSEPP 30-12*h* is a reference point for the connection point between VPLMN and HPLMN.

(R)AN 20 is connected to UE 10, AMF 30-1 and UPF 40.

In VPLMN, AMF 30-1, SMF 30-2, NSSF 30-3, NEF 30-4, NRF 30-5, PCF 30-8, and NSACF 30-10 are interconnected with each other via interfaces Namf, Nsmf, Nnssf, Nnef, Nnrf, Npcf, and Nsacf, based on the respective services.

In HPLMN, SMF 30-2, NSSF 30-3, NEF 30-4, NRF 30-5, UDM 30-6, AUSF 30-7, PCF 30-8, AF 30-9, NSACF 30-10, and NSSAAF 30-11 are interconnected with each other via interfaces Nsmf, Nnssf, Nnef, Nnrf, Nudm, Nausf, Npcf, Naf, and Nsacf, and Nnssaaf, based on the respective services.

vSEPP 30-12*v* is connected to AMF 30-1, SMF 30-2, NSSF 30-3, NEF 30-4, NRF 30-5, PCF 30-8 and NSACF 30-10 of VPLMN and is connected to hSEPP 30-12*h* via N32.

hSEPP 30-12*h* is connected to SMF 30-2, NSSF 30-3, NEF 30-4, NRF 30-5, UDM 30-6, AUSF 30-7, PCF 30-8, AF 30-9, NSACF 30-10, and NSSAAF 30-11 of HPLMN and is connected to vSEPP 30-12*v* via N32.

UPF 40 on a VPLMN side interconnects (R)AN 20, SMF 30-2 and UPF 40 on an HPLMN side. UPF 40 of HPLMN interconnects SMF 30-2 and Data Network (DN) 50.

Figure 2:
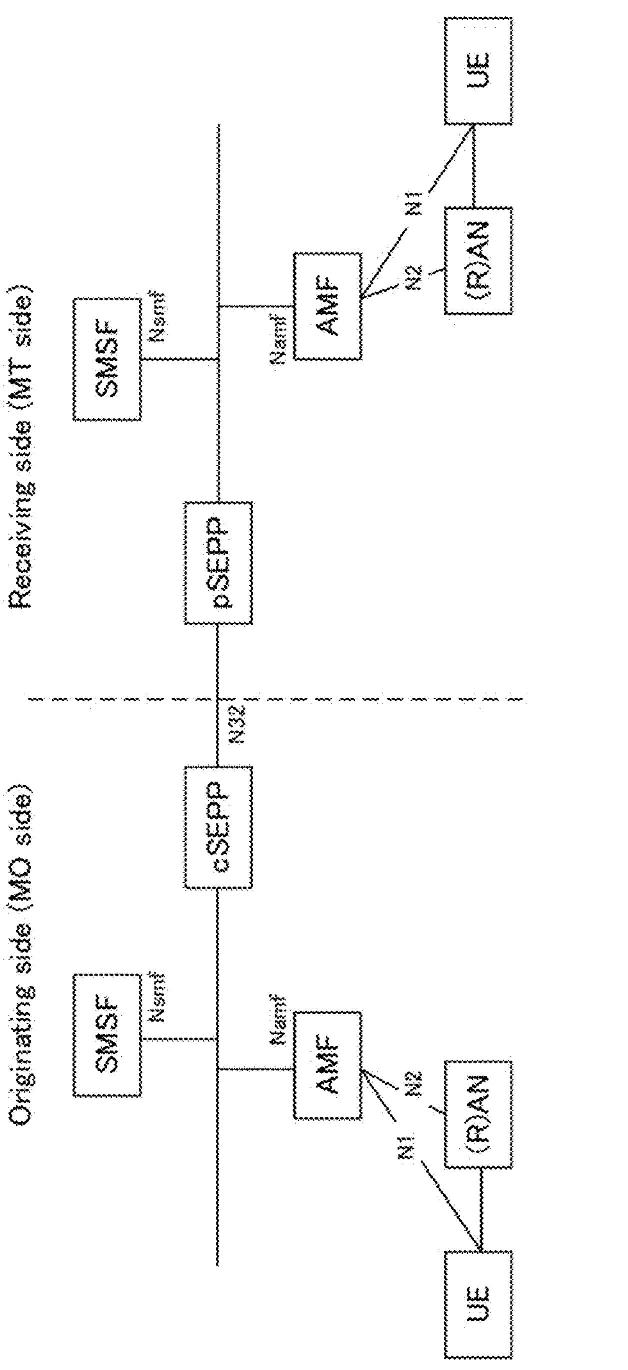
FIG. 2 is a diagram illustrating another exemplary communication system according to the embodiment of the present disclosure.

Incidentally, the communication system in an Interconnect form is a configuration of FIG. 2. For Interconnect, a consumer side (originating side) SEPP (cSEPP) corresponds to vSEPP 30-12*v* of Roaming (FIG. 1), and a producer side (receiving side) SEPP (pSEPP) corresponds to rSEPP 30-12*r* of Roaming (FIG. 1).

(Initial Connection Establishment: N32-c)

Next, a description will be given of a determination process as to whether initial connection establishment (Handshake) of N32 taking into account an application of connection between carriers is possible, according to the present embodiment, with reference to FIGS. 3 to 5.

Figure 3:
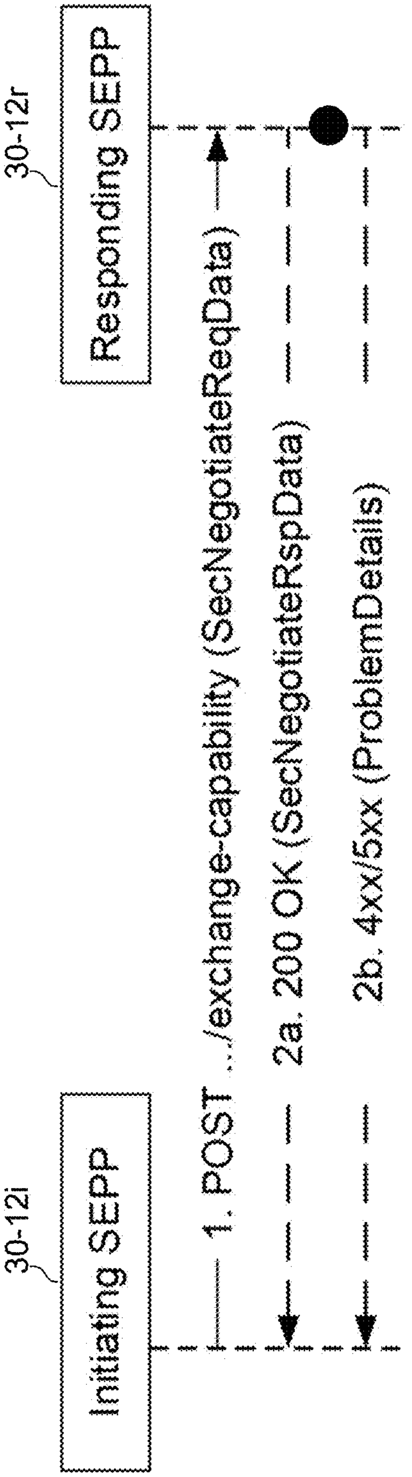
FIG. 3 is a sequence diagram for describing a procedure of negotiation between SEPPs of a communication system according to the embodiment of the present disclosure.

As illustrated in FIG. 3, negotiation between SEPPs is performed by the following procedures.

(Procedure 1) Initiating side SEPP 30-12*i* transmits an HTTP POST request including SecNegotiateReqData to responding side SEPP 30-12*r*. Responding side SEPP 30-12*r* determines whether the request succeeds or fails, that is, whether the connection establishment of N32 is possible, by the determination process to be described, hereinafter. Note that in FIG. 3, the determination process performed by responding side SEPP 30-12*r* is represented by a black dot.

(Procedure 2a)

When the request succeeds, responding side SEPP 30-12*r* transmits a "200 OK" status code including SecNegotiateRspData to initiating side SEPP 30-12*i*.

(Procedure 2b)

When the request fails, responding side SEPP 30-12*r* transmits a "4xx/5xx" status code and ProblemDetails indicating the reason for the rejection to initiating side SEPP 30-12*i*.

FIG. 4 is a diagram indicating a definition of the control signal SecNegotiationReqData. Further, FIG. 5 is a diagram indicating a definition of the control signal SecNegotiationRsqData.

The definition of SecNegotiationReqData indicated in FIG. 4 results from addition of a new Attribute, which is usagePurpose, to Definition of type SecNegotiationReqData described in Table 6 1.5.2.2-1 of NPL 2. Initiating side SEPP 30-12*i* designates an application of connection by usagePurpose.

Likewise, the definition of SecNegotiationRspData indicated in FIG. 5 results from addition of a new Attribute, which is usagePurpose, to Definition of type SecNegotiationRspData described in Table 6. 1.5.2.3-1 of NPL 2. Responding side SEPP 30-12*r* designates an authorized application of connection by usagePurpose.

Note that, as indicated in FIG. 6, the applications (purposes) of N32 may be defined by a table of ENUM types (enumerated types).

The applications (purposes) of connection include Roaming, Interconnect (interconnection), General (such as general inquiries), a Roaming test, an Interconnect test, and a general test.

Roaming means transmission and reception of necessary signals from VPLMN to HPLMN, such as acquisition, authentication, and position registration of subscriber information, and Session establishment for communication via Home network.

Interconnect means transmission and reception of signals for providing a service between users of different carriers.

General means applications other than Roaming and Interconnect, such as access to NRF including discovery of an apparatus (NF Discovery) and/or the like, and a state indication (Notification) from an NRF and/or another NF producer and/or the like.

The Roaming test means transmission and reception of an identification signal for experimentally performing normality checking on whether connection is possible before a start of Roaming.

The Interconnect test means transmission and reception of an identification signal for experimentally performing normality checking on whether connection is possible before a start of Interconnect.

The General test means transmission and reception of an identification signal for experimentally perform normality checking on whether connection is possible before a start of General.

Hereinafter, a description will be given of a determination process of responding side SEPP 30-12*r*.

In Procedure 1 of FIG. 3, upon reception of an HTTP POST request including SecNegotiateReqData from initiating side SEPP 30-12*i*, responding side SEPP 30-12*r* determines the application requested from initiating side SEPP 30-12*i* by usagePurpose of SecNegotiateReqData.

Responding side SEPP 30-12*r* then determines whether connection for the requested application is possible in an agreement (policy) between carriers.

When the application is available in the agreement, responding side SEPP 30-12*r* explicitly indicates the application in usagePurpose of SecNegotiationRspData and transmits a "200 OK" status code including SecNegotiateRspData to initiating side SEPP 30-12*i*

(Procedure 2a in FIG. 3).

Meanwhile, when the application is unavailable in the agreement, responding side SEPP 30-12*r* transmits a "4xx/5xx" status code and ProblemDetails indicating the reason for rejection to initiating side SEPP 30-12*i* (Procedure 2b in FIG. 3).

As described above, in the present embodiment, usagePurpose, which is a new attribute explicitly designating the application, is added to SecNegotiationReqData and SecNegotiationRsqData. Then, in the initial connection establishment, initiating side SEPP 30-12*i* transmits SecNegotiationReqData including usagePurpose to responding side SEPP 30-12*r* via N32. Responding side SEPP 30-12*r* determines whether connection for the application indicated by usagePurpose of SecNegotiationReqData is possible.

As described above, according to the present embodiment, the parameter for allowing checking of the application is added to the control signal from initiating side SEPP 30-12*i*, so that even when N32 is used for an application other than Roaming, responding side SEPP 30-12*r* can appropriately determine whether connection of N32 is possible.

(Signal Transfer: N32-f)

Next, a determination process as to whether transfer of a signal between an NF service consumer (NF Service Consumer) and an NF service producer (NF Service Producer) is possible after initial connection establishment will be described with reference to FIG. 7.

Figure 7:
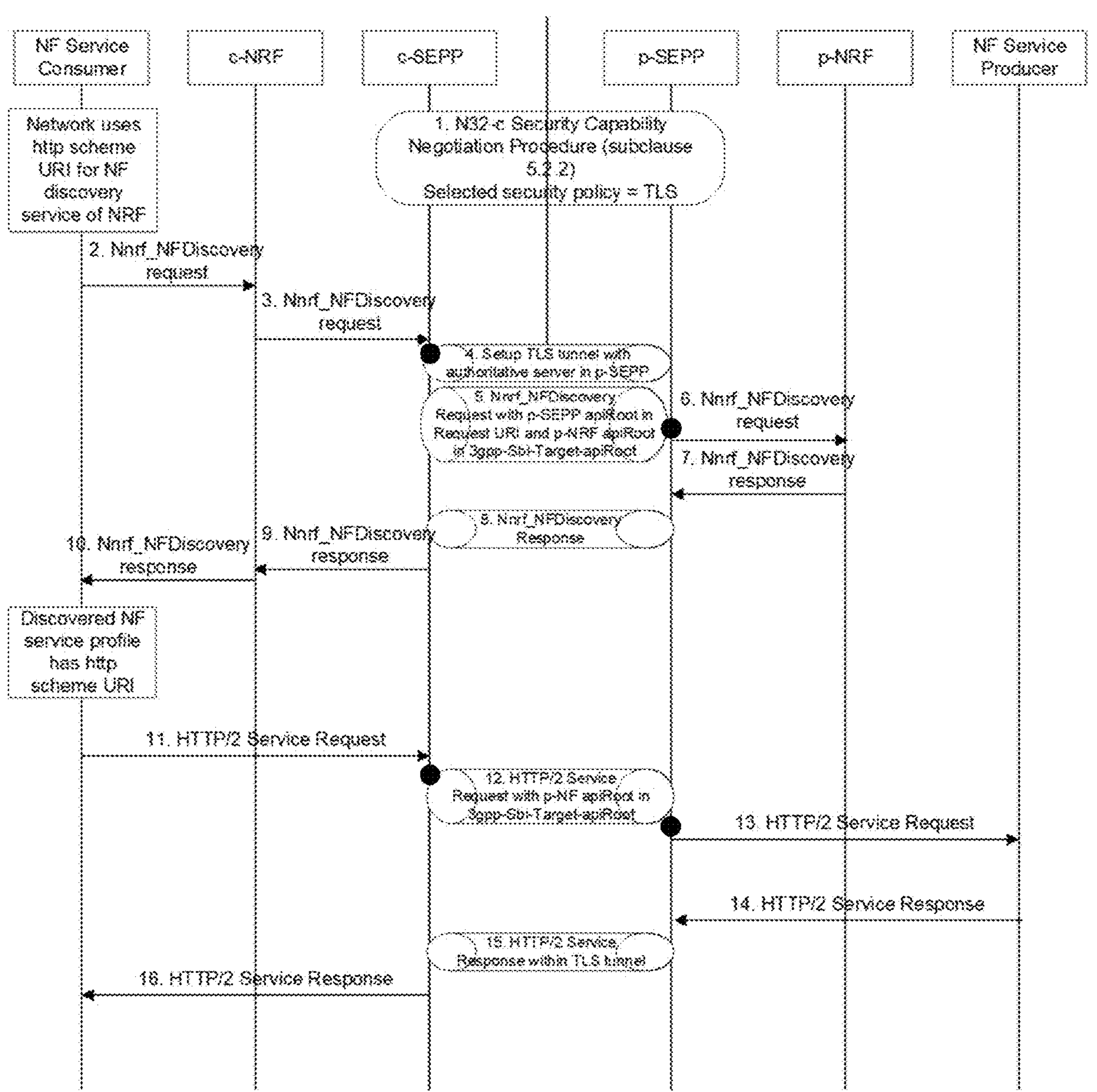
FIG. 7 is a sequence diagram for describing a procedure of transfer of a signal between an NF service consumer and an NF service producer according to the embodiment of the present disclosure.

As illustrated in FIG. 7, the transfer of a signal between an NF service consumer on a side utilizing an NF service and an NF service producer on a side providing the NF service is performed by the following procedures.

(Procedure 1)

An SEPP (c-SEPP) on the NF service consumer side and an SEPP (p-SEPP) on the NF service producer side negotiate a security function. The SEPP uses Transport Layer Security (TLS) as the security policy. TLS connection is configured between c-SEPP and p-SEPP for N32-f transfer.

(Procedure 2)

The NF service consumer transfers an Nnrf_NF Discovery request to c-NRF.

(Procedure 3)

c-NRF transfers an Nnrf_NF Discovery request to c-SEPP.

(Procedure 4)

c-SEPP configures an authoritative server and a TLS-tunnel in p-SEPP.

(Procedure 5)

c-SEPP configures apiRoot of a Request URL in apiRoot of p-SEPP, inserts 3 gpp-Sbi-Target-apiRoot headers (Custom header) configured in apiRoot of p-NRF, and transmits an Nnrf_NF Discovery request to p-SEPP.

(Procedure 6)

p-SEPP transfers an Nnrf_NF Discovery request to p-NRF.

(Procedure 7)

p-NRF transmits an Nnrf_NF Discovery response to p-SEPP.

(Procedure 8)

p-SEPP transfers an Nnrf_NF Discovery response within the TLS tunnel to c-SEPP.

(Procedure 9)

c-SEPP transfers an Nnrf_NF Discovery response to c-NRF.

(Procedure 10)

c-NRF transfers an Nnrf_NF Discovery response to the NF service consumer.

(Procedure 11)

The NF service consumer starts an HTTP message using a URI of an "http" scheme and transfers an HTTP/2 Service request to c-SEPP.

(Procedure 12)

c-SEPP transfers the HTTP/2 Service request to p-SEPP within the TLS tunnel.

(Procedure 13)

p-SEPP performs transfer to the NF service producer.

(Procedure 14)

The NF service producer transfers an HTTP/2 Service response to p-SEPP.

(Procedure 15)

p-SEPP transfers an HTTP/2 Service response to c-SEPP within the TLS tunnel.

(Procedure 16)

c-SEPP transfers an HTTP/2 Service response to the NF service consumer.

In the present embodiment, the NF service consumer configures a Custom header in at least one of an Nnrf_NF Discovery request and an HTTP/2 Service request each being a signal addressed to another network and writes information indicating the application in the at least one of them.

c-SEPP or p-SEPP determines whether the application written in the Nnrf_NF Discovery request or HTTP/2 Service request (hereinafter referred to as "requested application") is included in application(s) (purpose(s)) of N32 established in the initial connection, that is, the application(s) for which connection with a counterpart operator is permitted (hereinafter referred to as "permitted applications"). Note that, the determination process performed by c-SEPP or p-SEPP is represented by black dots in FIG. 7.

c-SEPP or p-SEPP transfers a signal when the requested application is included in the permitted applications (Procedures 6 and 13 in FIG. 7).

Meanwhile, when the requested application is not included in the permitted applications, c-SEPP or p-SEPP does not transfer the signal and returns, to the NF service consumer, an error response including information indicating that the signal cannot be transferred.

As described above, in the present embodiment, the NF service consumer writes the requested application in at least one of the Nnrf_NF Discovery request and HTTP/2 Service request. Then, c-SEPP or p-SEPP determines whether the requested application is included in the permitted applications.

As described above, according to the present embodiment, since the parameter allowing checking of an application is added to the control signal an NF service consumer, even when N32 is used for an application other than Roaming, the SEPP can appropriately determine whether connection of N32 is possible.

Further, the NF service consumer receives an error response including information indicating that transfer of the signal is impossible, so that the NF service consumer can grasp a reason for error that cannot be determined with an HTTP response code alone.

<Configuration of SEPP>

FIG. 8 is a diagram illustrating an exemplary functional configuration of SEPP 30-12 according to an embodiment of the present disclosure. As illustrated in FIG. 8, SEPP 30-12 includes transmission section 710, reception section 720, configuration section 730, and control section 740. The functional configuration illustrated in FIG. 8 is exemplary. As long as the operation according to the embodiment of the present disclosure can be performed, the functional divisions and functional sections are referred to by any terms.

Transmission section 710 includes a function of generating a signal to be transmitted and transmitting the generated signal to a network. Reception section 720 includes a function of receiving various signals and acquiring, for example, information of a higher layer from the received signal.

Configuration section 730 stores preconfigured information to be previously set and configuration information in a storage apparatus (storage section) and reads the preconfigured information and the configuration information from the storage apparatus as needed. Note that, configuration section 730 may be included in control section 740.

Control section 740 controls an entirety of SEPP 30-12. The functional part relating to signal transmission in control section 740 may be included in transmission section 710, and the functional part relating to signal reception in control section 740 may be included in reception section 720.

(Hardware Configuration)

Note that, the block diagrams used to describe the above embodiment illustrate blocks on a function-by-function basis. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (for example, via wires or by radio), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmitting unit," "transmission section," or "transmitter." The methods for implementing the functions are not limited specifically as described above.

For example, the base station and terminal and/or the like in one embodiment of the present disclosure may function as a computer that executes processing of a radio communication method of the present disclosure. FIG. 9 illustrates an exemplary hardware configuration of the terminal, base station, data hub access support, and another network node according to one embodiment of the present disclosure. Terminal 10, base station 20, and other network nodes 30-1 to 30-12, and 40 according to one embodiment of the present disclosure may be physically constituted as a computer apparatus including processor 1001, memory 1002, storage 1003, communication apparatus 1004, input apparatus 1005, output apparatus 1006, bus 1007, and/or the like.

Note that the term "apparatus" in the following description can be replaced with a circuit, a device, a unit, or the like. The hardware configurations of terminal 10, base station 20, and other network nodes 30-1 to 30-12, and 40 may include one apparatus or a plurality of apparatuses illustrated in FIG. 3 or may not include some of the apparatuses.

The functions of terminal 10, base station 20, and other network nodes 30-1 to 30-12, and 40 are implemented by predetermined software (program) loaded into hardware, such as processor 1001, memory 1002, and/or the like, according to which processor 1001 performs the arithmetic and controls communication performed by communication apparatus 1004 or at least one of reading and writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control section 102 and/or the like as described above may be implemented by processor 1001.

Processor 1001 reads a program (program code), a software module, data, and the like from at least one of storage 1003 and communication apparatus 1004 to memory 1002 and performs various types of processing according to the program (program code), the software module, the data, and the like. As the program, a program for causing the computer to perform at least a part of the operation described in the above embodiments is used. For example, control section 740 may be implemented by a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented using one or more chips. Note that the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be called as a register, a cache, a main memory (main storage apparatus), or the like. Memory 1002 can save a program (program code), a software module, and the like that can be executed to carry out the radio communication method according to one embodiment of the present disclosure.

Storage 1003 is a computer-readable recording medium and may be composed of, for example, at least one of an optical disk such as a Compact Disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called as an auxiliary storage apparatus. The storage medium as described above may be, for example, a database, a server, or other appropriate media including at least one of memory 1002 and storage 1003.

Communication apparatus 1004 is hardware (transmission and reception device) for communication between computers through at least one of wired and radio networks and is also called as, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, transmission section 710, reception section 720, and/or the like as described above may be implemented using communication apparatus 1004.

Input apparatus 1005 is an input device (e.g., a keyboard, a mouse, a microphone, a switch, a button, or a sensor) that receives input from the outside. Output apparatus 1006 is an output device (e.g., a display, a speaker, or an LED lamp) which makes outputs to the outside. Note that input apparatus 1005 and output apparatus 1006 may be integrated (e.g., a touch panel).

The apparatuses, such as processor 1001, memory 1002, and the like are connected by bus 1007 for communication of information. Bus 1007 may be configured using a single bus or using buses different between each pair of the apparatuses.

Furthermore, terminal 10, base station 20, and other network nodes 30-1 to 30-12, and 40 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented using at least one of these pieces of hardware.

(Notification of Information and Signaling)

The notification of information is not limited to the aspects or embodiments described in the present disclosure, and the information may be notified by another method. For example, the notification of information may be carried out by one or a combination of physical layer signaling (e.g., Downlink Control Information (DCI) and Uplink Control Information (UCI)), higher layer signaling (e.g., Radio Resource Control (RRC) signaling, Medium Access Control (MAC) signaling, broadcast information (Master Information Block (MIB), and System Information Block (SIB))), and other signals. The RRC signaling may be called an RRC message and may be, for example, an RRC connection setup message, an RRC connection reconfiguration message, or the like.

(Applied System)

The aspects and embodiments described in the present disclosure may be applied to at least one of a system using Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended based on the above systems. Additionally or alternatively, a combination of two or more of the systems (e.g., a combination of at least LTE or LTE-A and 5G) may be applied.

(Processing Procedure and the Like)

The orders of the processing procedures, the sequences, the flow charts, and the like of the aspects and embodiments described in the present disclosure may be changed as long as there is no contradiction. For example, elements of various steps are presented in exemplary orders in the methods described in the present disclosure, and the methods are not limited to the presented specific orders.

(Operation of Base Station)

Specific operations which are described in the present disclosure as being performed by the base station may sometimes be performed by a higher node (upper node) depending on the situation. Various operations performed for communication with a terminal in a network constituted by one network node or a plurality of network nodes including a base station can be obviously performed by at least one of the base station and a network node other than the base station (examples include, but not limited to, Mobility Management Entity (MME) or Serving Gateway (S-GW)). Although there is one network node in addition to the base station in the case illustrated above, a plurality of other network nodes may be combined (e.g., MME and S-GW).

(Direction of Input and Output)

The information or the like (see the item of "Information and Signals") can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (e.g., memory) or may be managed using a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (e.g., comparison with a predetermined value).

(Software)

Regardless of whether the software is called as software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information, and the like may be transmitted and received through a transmission medium. For example, when the software is transmitted from a website, a server, or another remote source by using at least one of a wired technique (e.g., a coaxial cable, an optical fiber cable, a twisted pair, and a digital subscriber line (DSL)) and a radio technique (e.g., an infrared ray and a microwave), the at least one of the wired technique and the radio technique is included in the definition of the transmission medium.

(Information and Signals)

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

("System" and "Network")

The terms "system" and "network" used in the present disclosure can be interchangeably used.

(Names of Parameters and Channels)

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulas and the like using the parameters may be different from the ones explicitly disclosed in the present disclosure. Various channels (e.g., PUCCH and PDCCH) and information elements, can be identified by any suitable names, and various names assigned to these various channels and information elements are not limitative in any respect.

(Base Station (Radio Base Station))

The terms "Base Station (BS)," "radio base station," "fixed station," "NodeB," "eNodeB (eNB)," "gNodeB (gNB)," "access point," "transmission point," "reception point, "transmission/reception point," "cell," "sector," "cell group," "carrier," "component carrier," and the like may be used interchangeably in the present disclosure. The base station may be called a macro cell, a small cell, a femtocell, or a pico cell.

The base station can accommodate one cell or a plurality of (e.g., three) cells. When the base station accommodates a plurality of cells, the entire coverage area of the base station can be divided into a plurality of smaller areas, and each of the smaller areas can provide a communication service based on a base station subsystem (e.g., small base station for indoor remote radio head (RRH)). The term "cell" or "sector" denotes part or all of the coverage area of at least one of the base station and the base station subsystem that perform the communication service in the coverage.

(Terminal)

The terms "Mobile Station (MS)," "user terminal," "User Equipment (UE)," and "terminal" may be used interchangeably in the present disclosure.

The mobile station may be called, by those skilled in the art, a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or by some other appropriate terms.

(Base Station/Mobile Station)

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the base station and the mobile station also includes an apparatus that does not necessarily move during communication operation. For example, at least one of the base station and the mobile station may be Internet-of-Things (IoT) equipment such as a sensor.

The base station in the present disclosure may also be replaced with the user terminal. For example, the aspects and the embodiments of the present disclosure may find application in a configuration that results from replacing communication between the base station and the user terminal with communication between multiple user terminals (such communication may, e.g., be referred to as device-to-device (D2D), vehicle-to-everything (V2X), or the like). In this case, the terminal may be configured to have the functions that the base station described above has. The wordings "uplink" and "downlink" may be replaced with a corresponding wording for inter-equipment communication (e.g., "side"). For example, an uplink channel, a downlink channel, and the like may be replaced with a side channel.

Similarly, the terminal in the present disclosure may be replaced with the base station. In this case, the base station is configured to have the functions that the terminal described above has.

(Meaning and Interpretation of Terms)

As used herein, the term "determining" may encompass a wide variety of actions. For example, "determining" may be regarded as judging, calculating, computing, processing, deriving, investigating, looking up, searching (or, search or inquiry)(e.g., looking up in a table, a database or another data structure), ascertaining and the like. Furthermore, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming," "expecting," "considering," and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

(Reference Signal)

The reference signal can also be abbreviated as an RS and may also be called as a pilot depending on the applied standard.

(Meaning of "Based on")

The description "based on" used in the present disclosure does not mean "based only on," unless otherwise specified. In other words, the description "based on" means both of "based only on" and "based at least on."

("First" and "Second")

Any reference to elements by using the terms "first," "second," and the like does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

(Means)

The "section" in the configuration of each apparatus may be replaced with "means," "circuit," "device," or the like.

(Open Form)

In a case where terms "include," "including," and their modifications are used in the present disclosure, these terms are intended to be inclusive like the term "comprising." Further, the term "or" used in the present disclosure is not intended to be an exclusive or.

(Time Units Such as TTI, Frequency Units Such as RB, and Radio Frame Configuration)

The radio frame may be constituted by one frame or a plurality of frames in the time domain. The one frame or each of the plurality of frames may be called a subframe in the time domain. The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology, for example, indicates at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., Orthogonal Frequency Division Multiplexing (OFDM)) symbol, Single Carrier-Frequency Division Multiple Access (SC-FDMA) symbol, or the like) in the time domain. The slot may also be a time unit based on the numerology.

The slot may include a plurality of mini-slots. Each of the mini-slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini slot, and the symbol indicate time units in transmitting signals. The radio frame, the subframe, the slot, the mini slot, and the symbol may be called by other corresponding names.

For example, one subframe, a plurality of continuous subframes, one slot, or one mini-slot may be called a Transmission Time Interval (TTI). That is, at least one of the subframe and the TTI may be a subframe (1 ms) in the existing LTE, a duration (e.g., 1 to 13 symbols) that is shorter than 1 ms, or a duration that is longer than 1 ms. Note that, a unit that represents the TTI may be referred to as a slot, a mini-slot, or the like instead of a subframe.

Here, the TTI, for example, refers to a minimum time unit for scheduling in radio communication. For example, in an LTE system, the base station performs scheduling for allocating a radio resource (a frequency bandwidth, a transmit power, and the like that are used in each user terminal) on a TTI-by-TTI basis to each user terminal. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (for example, the number of symbols) to which the transport block, the code block, the codeword, or the like is actually mapped may be shorter than the TTI.

Note that, in a case where one slot or one mini-slot is referred to as the TTI, one or more TTIs (that is, one or more slots, or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that the long TTI (for example, the usual TTI, the subframe, or the like) may be replaced with the TTI that has a time length which exceeds 1 ms, and the short TTI (for example, the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the RB may include one symbol or a plurality of symbols in the time domain, and may have a length of one slot, one mini slot, one subframe, or one TTI. One TTI and one subframe may be constituted by one resource block or a plurality of resource blocks.

Note that one or more RBs may be referred to as a Physical Resource Block (PRB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common resource blocks (RB) for certain numerology in a certain carrier. Here, the common RBs may be identified by RB indices that use a common reference point of the carrier as a reference. The PRB may be defined by a certain BWP and may be numbered within the BWP.

The BWP may include a UL BWP and a DL BWP. An UE may be configured with one or more BWPs within one carrier.

At least one of the configured BWPs may be active, and the UE does not have to assume transmission/reception of a predetermined signal or channel outside the active BWP. Note that, "cell," "carrier," and the like in the present disclosure may be replaced with "BWP."

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

In a case where articles, such as "a," "an," and "the" in English, for example, are added in the present disclosure by translation, nouns following these articles may have the same meaning as used in the plural.

In the present disclosure, the expression "A and B are different" may mean that "A and B are different from each other." Note that, the expression may also mean that "A and B are different from C." The expressions "separated" and "coupled" may also be interpreted in the same manner as the expression "A and B are different."

(Variations and the Like of Aspects)

The aspects and embodiments described in the present disclosure may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiments described in the present disclosure. Modifications and variations of the aspects of the present disclosure can be made without departing from the spirit and the scope of the present disclosure defined by the description of the appended claims. Therefore, the description of the present disclosure is intended for exemplary description and does not limit the present disclosure in any sense.

INDUSTRIAL APPLICABILITY

One aspect of the present disclosure is useful, for example, for radio communication systems.

REFERENCE SIGNS LIST

10 UE
20 (R)AN
30-12 SEPP
**30-12*v*** vSEPP
**30-12*h*** hSEPP
**30-12*i*** Initiating side SEPP
**30-12*r*** Responding side SEPP
710 Transmission section
720 Reception section
730 Configuration section
740 Control section

The invention claimed is:

1. A network node to be connected to another network node via an N32 interface and transfers signals between a Network Function (NF) Service Consumer and an NF Service Producer, wherein the network node is a c-SEPP (Security Edge Protection Proxy) in a network on the NF Service Consumer side, and the other network node is a p-SEPP in a network on the NF Service Producer side, the network node comprising:

a receiver that receives a request including a purpose of the request from the NF Service Consumer, a processor that determines whether the purpose of the request matches any of permitted purposes, and a transmitter that transmits the request to the other network node if the purpose of the request matches any of the permitted purposes.

2. The network node according to claim 1, wherein the request is not forwarded if the purpose of the request does not match any of the permitted purposes.

3. The network node according to claim 1, wherein a custom header is set in the request, and the purpose of the request is written in the custom header.

4. A network node to be connected to another network node via an N32 interface and transfers signals between a Network Function (NF) Service Consumer and an NF Service Producer, wherein the network node is a p-SEPP (Security Edge Protection Proxy) in a network on the NF Service Producer side, and the other network node is a c-SEPP in a network on the NF Service Consumer side, the network node comprising:

a receiver that receives a request including a purpose of the request from the c-SEPP, a processor that determines whether the purpose of the request matches any of permitted purposes, and a transmitter that transmits the request to the NF Service Producer if the purpose of the request matches any of the permitted purposes.

5. A communication method for a network node to be connected to another network node via an N32 interface and transfers signals between a Network Function (NF) Service Consumer and an NF Service Producer, wherein the network node is a c-SEPP (Security Edge Protection Proxy) in a network on the NF Service Consumer side, and the other network node is a p-SEPP in a network on the NF Service Producer side, receiving a request including a purpose of the request from the NF Service Consumer, determining whether the purpose of the request matches any of permitted purposes, and transmitting the request to the other network node if the purpose of the request matches any of the permitted purposes.

* * * * *